(12) United States Patent
Xue et al.

(10) Patent No.: US 7,767,134 B2
(45) Date of Patent: Aug. 3, 2010

(54) TEMPLATED CARBON MONOLITHIC TUBES WITH SHAPED MICRO-CHANNELS AND METHOD FOR MAKING THE SAME

(75) Inventors: Lixin Luke Xue, Midlothian, VA (US); Shuzhong Zhuang, Richmond, VA (US); Liqun Yu, Midlothian, VA (US); John B. Paine, III, Midlothian, VA (US)

(73) Assignee: Philip Morris USA Inc., Richmond, VA (US)

( * ) Notice: Subject to any disclaimer, the term of this patent is extended or adjusted under 35 U.S.C. 154(b) by 1407 days.

(21) Appl. No.: 11/170,272

(22) Filed: Jun. 29, 2005

(65) Prior Publication Data

US 2007/0000508 A1   Jan. 4, 2007

(51) Int. Cl.
*C01B 31/00* (2006.01)

(52) U.S. Cl. ........................ 264/629; 131/211; 131/339; 131/338; 264/632

(58) Field of Classification Search .................. 131/211, 131/339, 338; 264/632; 493/4, 42, 44, 39; 425/289
See application file for complete search history.

(56) References Cited

U.S. PATENT DOCUMENTS

| | | | |
|---|---|---|---|
| 2,881,770 A | 4/1959 | Touey et al. | |
| 3,101,723 A | 8/1963 | Seligman et al. | |
| 3,353,543 A | 11/1967 | Sproull et al. | |
| 4,281,671 A | 8/1981 | Bynre et al. | |
| 4,481,958 A | 11/1984 | Rainer et al. | |
| 4,917,835 A | 4/1990 | Lear et al. | |
| 5,057,368 A | 10/1991 | Largman et al. | |
| 5,820,967 A | 10/1998 | Gadkaree | |
| 5,947,126 A * | 9/1999 | Wilson et al. ............... | 131/331 |
| 5,972,253 A | 10/1999 | Kimber | |
| 6,584,979 B2 | 7/2003 | Xue et al. | |
| 6,772,768 B2 | 8/2004 | Xue et al. | |
| 2002/0020420 A1 | 2/2002 | Xue et al. | |

FOREIGN PATENT DOCUMENTS

| | | |
|---|---|---|
| WO | WO-95/28279 | 10/1995 |
| WO | WO-03/086116 | 10/2003 |

\* cited by examiner

*Primary Examiner*—Philip C Tucker
*Assistant Examiner*—Michael J Felton
(74) *Attorney, Agent, or Firm*—Connolly Bove Lodge & Hut LLP

(57) ABSTRACT

Disclosed is a method for forming an article with template shaped channels by (a) mixing a precursor with a fibrous template, (b) forming the mixture into a pre-determined shape, (c) curing the mixture to form a precursor composite, (d) carbonizing the precursor composite, and (e) decomposing the fibrous template to yield a shaped carbon article with template shaped channels.

9 Claims, 2 Drawing Sheets

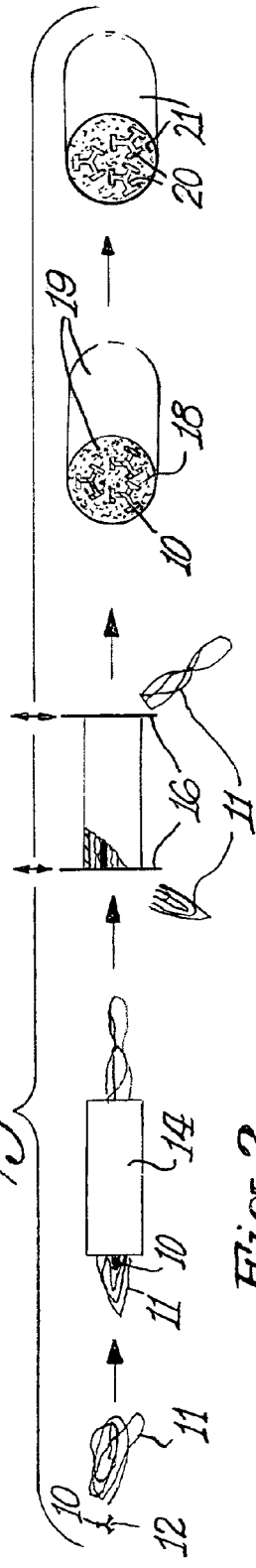

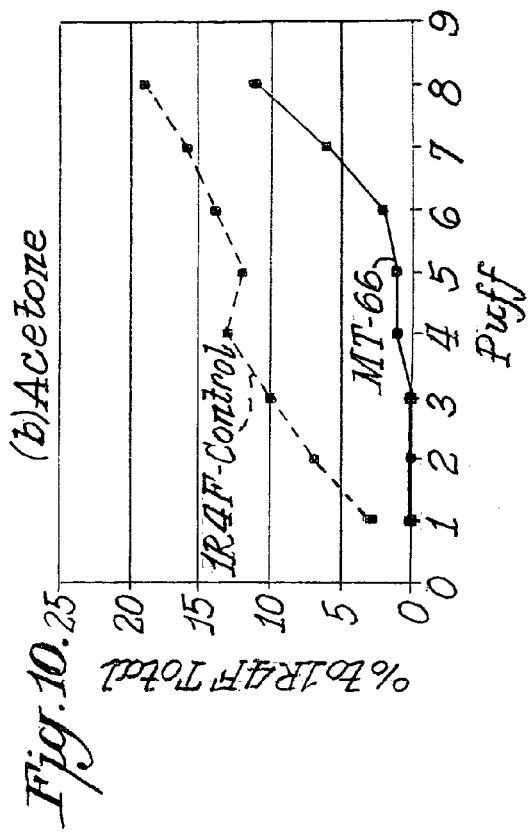
Fig. 10. (b) Acetone
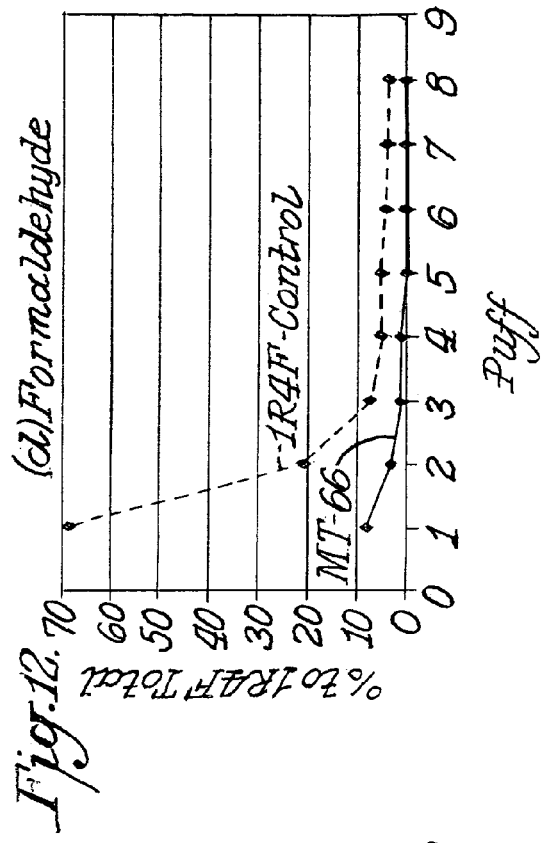
Fig. 12. (d) Formaldehyde
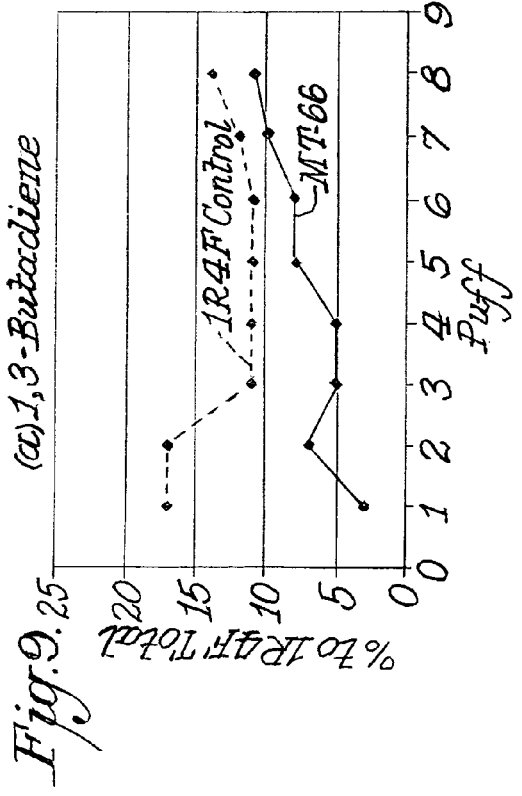
Fig. 9. (a) 1,3-Butadiene
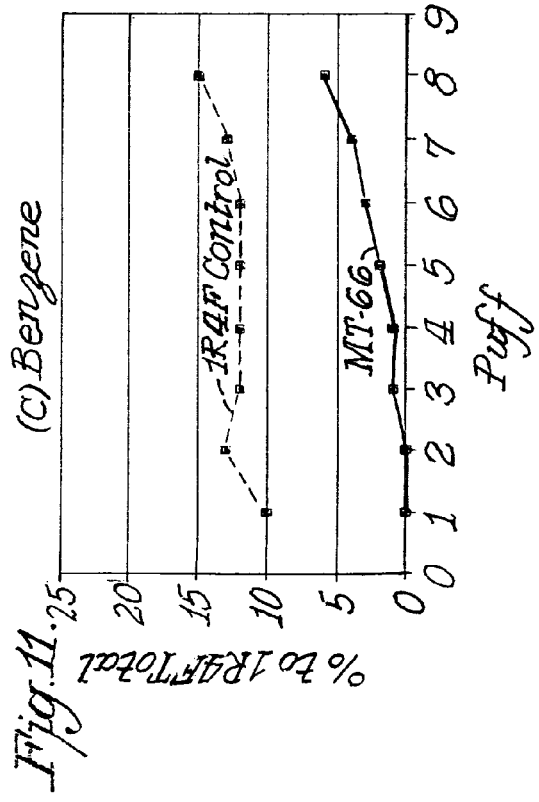
Fig. 11. (c) Benzene

TEMPLATED CARBON MONOLITHIC TUBES WITH SHAPED MICRO-CHANNELS AND METHOD FOR MAKING THE SAME

BACKGROUND OF THE INVENTION

Smoking articles, particularly cigarettes, generally comprise a tobacco rod of shredded tobacco (usually, in cut filler form) surrounded by a paper wrapper, and a cylindrical filter aligned in an end-to-end relationship with the tobacco rod. Typically, the filter includes a plug of cellulose acetate tow attached to the tobacco rod by tipping paper.

Upon lighting a cigarette, a smoker draws mainstream smoke from the lit end of the cigarette. The drawn cigarette smoke first enters the upstream end portion of the filter and then passes through the downstream portion adjacent the buccal end of the cigarette, upon which the user draws the smoke.

To achieve appropriate filtration efficiency, materials such as carbon have been incorporated into cigarette filters. A current method for incorporating adsorbent materials in cigarette filters is the physical entrapment of adsorbent particles between cellulose acetate (CA) fibers. An improved and more expensive design is to put certain materials in the cavity between CA plugs in a predetermined configuration, such as a plug-space-plug filter configuration, to limit the exposure of adsorbent to the triacetin binder.

Certain cigarettes incorporate filter segments with adsorbent materials such as activated carbon to achieve desired filtering characteristics. Examples of such filters are described in U.S. Pat. Nos. 2,881,770 to Tovey; 3,353,543 to Sproull et al.; 3,101,723 to Seligman et al.; and 4,481,958 to Ranier et al. Certain commercially available filters have particles or granules of carbon (e.g., an activated carbon material) alone or dispersed within a CA tow. Other commercially available filters have carbon threads dispersed therein; while still other commercially available filters have so-called "plug-space-plug", "cavity filter" or "triple filter" designs. Examples of commercially available filters are SCS IV Dual Solid Charcoal Filter and Triple Solid Charcoal Filter from Filtrona International, Ltd.; Triple Cavity Filter from Baumgartner; and ACT from Filtrona International, Ltd. Detailed discussion of the properties and composition of cigarettes and filters is found in U.S. Pat. Nos. 5,404,890 and 5,568,819, both to Gentry et al, the disclosures of which are hereby incorporated by reference.

Cigarette filter elements which incorporate carbon have the ability to remove constituents of mainstream smoke that pass therethrough. In particular, activated carbon has the propensity to reduce the levels of certain gas phase components present in the mainstream smoke, resulting in a change in the organoleptic and toxicological properties of that smoke.

It would be desirable to provide a cigarette having a cigarette filter incorporating carbon and/or other materials capable of absorbing and/or adsorbing gas phase components present in mainstream cigarette smoke, while providing favorable absorption/adsorption, dilution and drawing characteristics, so as to enhance consumer acceptability.

Furthermore, commercially available activated carbons and molecular sieves are typically in granular and powdered forms. Materials in these forms do not maintain product cohesion, as granules or grains tend to settle after being packed inside a cigarette filter. It is therefore desirable to form rod-shaped, channeled, activated carbon articles, such as monolithic tubes, for use in cigarette filtration to achieve lower resistance to draw, higher total particulate matter delivery, and better product integrity.

SUMMARY OF THE INVENTION

According to a preferred embodiment of the invention, a method is provided for mixing excess carbon precursor materials such as phenolic resins with fibrous templates made of low carbon yielding materials such as polypropylene; forming the mixture into a predetermined shape, such as by pulling the mixture through a paper, plastic, metal or glass tube; trimming the excess mixture or cutting the tube to form a cylindrical shape; curing the mixture in the tube to form a precursor composite with a stable shape; removing the tube; carbonizing the precursor composite under inert media or vacuum; and decomposing the fibrous templates to yield shaped carbon articles, such as monolithic tubes with shaped channels.

Further according to a preferred embodiment of the invention, carbon monolithic articles with shaped channels are provided and used to form filters, and more particularly cigarette filters that are effective at reducing smoke gas phase components.

BRIEF DESCRIPTION OF THE FIGURES

Novel features and advantages of the present invention in addition to those mentioned above will become apparent to persons of ordinary skill in the art from a reading of the following detailed description in conjunction with the accompanying drawings wherein similar reference characters refer to similar parts and in which:

FIG. 1 is a schematic diagram showing the steps to form a shaped channeled cigarette filter according to the present invention;

FIG. 2 is a side elevational view of a cigarette with portions thereof broken away to illustrate interior details including a plug-space-plug filter with filter comprising a carbon article according to the present invention;

FIG. 3 illustrates the cross-section of a tri-lobal shaped fibrous template according to the present invention;

FIG. 4 illustrates the cross-section of a quadri-lobal shaped fibrous template according to the present invention;

FIG. 5 illustrates the cross-section of a V-shaped fibrous template according to the present invention;

FIG. 6 illustrates the cross-section of nested stylized I-shaped fibrous templates according to the present invention;

FIG. 7 illustrates the cross-section of a C shaped fibrous template according to the present invention;

FIG. 7A illustrates the cross-section of a round fibrous template according to the present invention;

FIG. 7B illustrates the cross-section of a tubular fibrous template according to the present invention;

FIG. 8 illustrates the cross-section of an irregular shaped fibrous template according to the present invention;

FIG. 9 illustrates a puff-by-puff comparison between the performance of the 1R4F sample with a CA filter according to the prior art and a cigarette with a filter prepared according to the present invention with regard to 1,3-butadiene delivery;

FIG. 10 illustrates a puff-by-puff comparison between the performance of a 1R4F sample with a CA filter according to the prior art and a cigarette with a filter prepared according to the present invention with regard to acetone delivery;

FIG. 11 illustrates a puff-by-puff comparison of performance of a 1R4F sample with a CA filter according to the prior art and a cigarette with a filter prepared according to the present invention with regard to benzene delivery; and FIG. 12 illustrates a puff-by-puff comparison between the performance of a 1R4F sample with a CA filter according to the prior art and a cigarette with a filter prepared according to the present invention with regard to formaldehyde delivery.

DETAILED DESCRIPTION OF A PREFERRED EMBODIMENT

FIGS. 1 and 2 illustrate examples of a process and a final product according to the present invention. It will be readily understood that the scope of this invention is not limited to these embodiments. Rather, the scope of the present invention includes alternatives that incorporate the filter and method of making the filter described herein.

As shown in FIG. 1, a typical process suitable for the mixing step may start with a fibrous template 10 with hollow channels 12. Fibrous template 10 may be made from a material that will leave an insignificant amount of residue upon thermal decomposition. Templates 10 may also comprise low carbon yielding materials. A preferred material for this purpose is polypropylene (PP).

The fibrous template 10 can be formed with a cross-section of any of various shapes including, but not limited to, trilobal shaped, quadri-lobal shaped, V-shaped, stylized I-shaped or nested stylized I-shaped, C-shaped, round, tubular, and irregular shaped, as designated by reference numerals 10 through 10G in FIGS. 3 through 8, respectively. The shapes can be formed through extrusion, spinning or other shape forming process as taught, for example, in U.S. Pat. No. 5,057,368 to Largman et al. The cross-sectional shape of the template provides longitudinal channels 12 that may be continuous and that open to the surface of template 10. Longitudinal channels 12 may have a variety of shapes depending on the template shape, as designated by reference numerals 12A through 12E in FIGS. 3 through 8, respectively.

The fibrous template bundle can be mixed with a carbon precursor in a container (not shown) to form a precursor laden bundle 11. The mixing step may be conducted in accord with well known techniques, such as described in U.S. Pat. Nos. 6,584,979 and 5,772,768 to Xue et al. Additional methods are well known as taught for example in "Highly Efficient Acid-Gas Removing Shaped Fiber Filters", Fundamental and Applied Aspects of Chemically Modified Surfaces; The Royal Society of Chemistry; Ed. by C. Little and J. Blitz; page 154, 1999. Certain levels of agitation or rotation of the container may be necessary to achieve continuously homogeneous impregnation of templates 10 with precursor 18.

The carbon precursor materials used in the mixing step may be solid particles, gels, liquids, foams or mixtures thereof, which yield carbon or carbonoid materials upon heating to an adequate temperature in an inert atmosphere or under vacuum. Suitable materials in these classes include, but are not limited to, phenolic resin, petroleum pitches, polyacrylonitrile, cellulose, cellulose derivatives, polyvinyl acetate (PVA) and their mixtures. Additional inorganic materials such as molecular sieves, zeolites, and silicates may be included in the mixture to modify the pore-distribution of the final carbonoid products. The phenolic resins used can be uncured or partially cured Novolak types with the presence of curing agents, or Resole (self-curing) types or mixtures of these. The production of porous shaped phenolic based carbon materials from a committed partially cured resin is taught, for example, in U.S. Pat. No. 4,917,835 to Lear et al.

Fibrous template 10 may be handled as a random bunch or bundle 11 or in a manner such that templates or template segments may or may not be relatively aligned. Bundle 11, which may comprise single or multiple fibers, is then pulled with carbon precursor 18 through a mold 14 with defined dimensions, which is shown in FIG. 1, for example, as a tube. The mold may comprise paper, plastic, metal, or glass.

An amount of carbon precursor 18 may be included in the mixture so that templates 10 are integrated into a unified piece. Any voids, openings or annular spaces in the mold 14 may be filled with precursor 18. The weight ratio of carbon precursor 18 to polypropylene template 10, also called the loading factor, is preferably within, but not limited to, the range of 0.2-6.

Continuous impregnation processes using continuous rolls of template fibers 10 can be used to accomplish similar results to the batch process. Templates 10 can be pulled continuously through the container (not shown) containing the carbon precursor 18, reassembled through a cone-shaped guide (not shown) and integrated into a continuous mold (not shown) for further processing. Certain levels of agitation or rotation of the mold may be necessary to achieve continuously homogeneous impregnation. U.S. application Ser. No. 10/294,346 entitled "Continuous Process for Impregnating Solid Adsorbent Particles into Shaped Micro-cavity Fibers and Fiber Filters" is hereby incorporated by reference in its entirety and describes exemplary processes for continuous processing and impregnation of fibrous templates.

After impregnating mold 14 with the mixture comprising template 10 and precursor 18, excess templates 10 and/or precursor 18 of bundle 11 may extend from the mold 14 as shown in FIG. 1. Blades 16 may be used to obtain desirable lengths as well as to remove any excess templates 10 of bundle 11 or precursor 18 extending from mold 14.

Precursor 18 and template 10 are then cured to form composite 19. To cure the mixture, conditions may be selected to maintain the integrity of the templates 10 while the carbon precursor 18 is cured inside the mold. Curing conditions depend greatly on the components in carbon precursor 18, especially the uncured components used as binders. For example, curing can be accomplished by heating in a controlled atmosphere at a temperature of approximately 120-160° C. for approximately 15-60 minutes, though other temperatures and times are anticipated to be acceptable. A certain level of acid may be added to the phenolic precursor to accelerate the curing. After curing, the composite may retain its shape even if mold 14 is removed.

The composite may then be carbonized. For example, composite 19 may be heated in an inert environment and/or under vacuum, which may decompose template 10 and allow the composite 19 to a yield templated carbon article 21, such as a monolithic tube, with voids or channels 20. Carbonization temperatures can be selected based on the precursor used. For example, the temperature may be selected from the range of about 600° C. to about 950° C., and is preferably approximately 850° C. Channels 20 derive their shapes from those of templates 10. As with curing, conditions for the carbonization may vary based on the components in carbon precursor 18.

Various carbon yields and configurations can be obtained using various shapes and processing conditions. Table 1 lists seven examples conducted using various template shapes and processing conditions to achieve differing resulting channels. For each of the examples, a polypropylene template was mixed with a phenolic resin based carbon precursor. Templates of 16 and 24 denier per filament (dpf) were used with diameters of approximately 60-120 micrometers. In Table 1, the diameters are listed as d1. In the case of the trilobal shape, the diameter is based on the circular shape created by the cross-section. In the case of c-shaped or irregular shaped templates, d1 is given by two numbers, which represent the relative extent of the cross-section in two orthogonal directions. The templates were loaded into a mold with a loading factor of between 0.2 and 6. Curing took place at approximately 150° C. for approximately 25 to 40 minutes. Upon curing, the composites had a diameter D1. A certain level of acid may be added to the phenolic precursor to accelerate this curing time. Carbonizing was performed at approximately 850° C. for approximately 1-2 hours. Upon carbonizing, the diameter of the article was reduced to D2. Carbon yields were generally in the range of 30-40% by weight depending on the polypropylene content of the composite precursor. The channels formed in the carbon articles derived their shape from the shape of the template. The resulting diameter of the channels was d2, while the resulting number of channels per mm$^2$ is represented by N.

templated carbon article 21 prepared according to the present invention. The cigarettes can be smoked under FTC conditions and the smoke chemistry analyzed by FTIR and GC/MS methods. As shown in Tables 2-3 and FIGS. 9-12, the formed filters are effective at reducing a wide range of smoke gas phase components.

Table 2 compares a standard 1R4F cigarette to a cigarette containing a carbon article according to the present invention with the characteristics described in Example 5 from Table 1. The Kentucky Reference 1R4F is a filtered cigarette that has been provided by the Tobacco and Health Research Institute, University of Kentucky over the years for research purposes. The first row of Table 2 provides the TPM values of an 1R4F

TABLE 1

Examples of Processing Conditions and Shapes and the Final Product

| | Template | Loading | | Curing/150° C. | | Carbonizing/850° C. | | C_Tube | Channels | | |
|---|---|---|---|---|---|---|---|---|---|---|---|
| Example | Fiber | d1/μm | Factor | Min | D1/mm | Hour | Yield % | D2/mm | Shape | d2/μm | N/mm$^2$ |
| 1 | Trilobal-24dpf | 80 | 1.3 | 25 | 8 | 2 | 32 | 6.5 | Triad | 100-143 | 168 |
| 2 | Round-24dpf | 61 | 2.7 | 40 | 8 | 2 | 32 | 6 | R | 28-50 | 207 |
| 3 | Round-24dpf | 61 | 3.2 | 25 | 8 | 2 | 33 | 6 | R | n/a | 168 |
| 4 | Trilobal-24dpf | 80 | 4.8 | 35 | 8 | 2 | 36 | 5.5 | Triad | 48-65 | 168 |
| 5 | C-24dpf | 66 × 80 | 4.0 | 20 | 19 | 1 | 36 | 12 | C | 55-75 | 351 |
| 6 | Irregular-16pdf | 60 × 120 | 5.6 | 40 | 8 | 2 | 40 | 4 | 4DG | 66-120 | 322 |
| 7 | C-24dpf | 66 × 80 | 3.5 | 30 | 19 | 1 | 33 | 12 | C | 55-75 | 391 |

Templated carbon articles 21 can be activated to form high surface area adsorptive materials for filtration applications. Many activation processes are known in the literature such as heating with carbon dioxide or water steam. For example, the templated carbon article from Example 7 in Table 1 can be activated with carbon dioxide at a temperature of 950° C. for approximately 40 minutes. At a 25% burn-off rate, a BET surface area of 1219 m$^2$/g and a micro-pore volume (<20 A) of 0.4469 cm$^3$/g have been obtained. These values are comparable to those of coconut based activated carbon, which may also be used as adsorbent in cigarette filters.

The carbon article can additionally be activated to enhance its filtering characteristics. For example, modified cigarette models containing a 66 mg activated templated carbon article can be formed according to Example 5 from Table 1 and the carbon can then be activated at a temperature of approximately 950° C. for approximately 30 minutes to achieve a burn-off rate of 30%. As shown in FIG. 2, the filters can be arranged such that conventional plugs 22 and 24 surround sample. The standard deviation is given with the 1R4F data. The second row of Table 2 lists the characteristics of modified samples MT-66-1 and MT-66-2, which were made according to the present invention and which were provided as a percentage difference in characteristics from the control sample 1R4F. Modified samples MT-66-1 and MT-66-2 were cigarettes with the structure shown in FIG. 2 in which plug 22 was 15 mm, plug 24 was 7 mm and the carbon article 26 was 5 mm in axial length and the carbon article weighed 66 mg, though any lengths and/or weights could be selected.

The values reported for modified samples MT-66-1 and MT-66-2 are given as a change from the 1R4F standard. A change of greater than three times the standard deviation of the 1R4F control sample is considered significant. As shown in Table 2, the amount of acetaldehyde (AA), hydrogen cyanide (HCN), methanol (MEOH) and isoprene (ISOP) in the total particulate matter (TPM) all decreased as a result of employing the present invention.

TABLE 2

Characteristics of control cigarette compared to those of modified cigarettes.

| SAMPLE | AA (TPM) | HCN (TPM) | MEOH (TPM) | ISOP (TPM) | TPM (mg) | RTD | CF (mg) |
|---|---|---|---|---|---|---|---|
| 1R4F (TPM × 10$^{-3}$) | 51.5 | 9.2 | 6.2 | 23.7 | 13.3 | 140 | 0.0 |
| Standard Deviation | 8% | 4% | 9% | 8% | 3% | 5% | |
| Modified Sample MT-66-1 | −32% | −34% | −32% | −40% | 16.6 | 113 | 66 |
| Modified Sample MT-66-2 | −54% | −32% | −44% | −38% | 13.0 | 119 | 66 |

Table 3 further illustrates the benefits of the present invention. The first column lists characteristics and components common to cigarettes and cigarette smoke. The second column, labeled "Control Sigma," lists the standard deviation of certain gas phase components present in a control 1 R4F cigarette. The third column, labeled "MT-66", lists the changes in component gas levels as a result of using filters made in accordance with the present invention, and more particularly Example 5 from Table 1.

TABLE 3

Change in Gas Phase Components

| Adsorbent-> Runs | Control Sigma | MT-66 |
|---|---|---|
| Carbon/mg | | 66 |
| Reference# | | 9627-79 |
| Gas phase components | | Change |
| Carbon Dioxide | 5% | No significant change |
| Ethane | 6% | No significant change |
| 1,3-Butadiene | 8% | −41% |
| Isoprene | 5% | −37% |
| Cyclopentadiene | 5% | −46% |
| 1,3-Cyclohexadiene | 17% | −80% |
| Methyl Cyclopentadiene | 9% | −84% |
| Formaldehyde | 14% | −86% |
| Acetone | 12% | −79% |
| Diacetyl | 5% | −93% |
| Methyl ethyl ketone | 4% | −90% |
| Isovaleraldehyde | 9% | −79% |
| Benzene | 8% | −82% |
| Toluene | 7% | −92% |
| Butyronitrile | 8% | −93% |
| 2-Methylfuran | 4% | −67% |
| 2,5-Dimethylfuran | 5% | −87% |
| 1-Methylpyrrole | 8% | −93% |
| Ketene | 11% | −85% |

FIGS. 9-12 further illustrate how MT-66 modified samples reduce the puff-by-puff delivery of 1,3-butadiene, acetone, benzene, and formaldehyde.

For example, FIG. 9 shows the average amount of 1,3-butadiene in mainstream smoke for different puffs from Kentucky reference IR4F cigarettes. 1,3-Butadiene in cigarette smoke is measured on a per puff basis. Cigarettes are smoked with a 35 cc puff volume of two second duration, once every 60 seconds. The puff-by-puff 1,3-butadiene deliveries are reported for eight determinations of 1R4F as well as the MT-66 sample. As shown in FIG. 9, the first puff accounts for between 15 and 20% of the total delivery of the 1R4F, but less than 5% for the MT-66 sample. The process is repeated seven more times according to well known and reported methods to obtain the graphs shown in FIGS. 9-12.

As shown in FIGS. 9, 10 and 11 the content the constituent gases increases each puff due to saturation of the filter. However, the content of formaldehyde, shown in FIG. 12, reduces to nearly zero for products incorporating the present invention.

The foregoing description of the invention illustrates and describes the present invention. Additionally, the disclosure shows and describes only the preferred embodiments of the invention, but it is to be understood that the invention is capable of use in various other combinations, modifications, and environments and is capable of changes or modifications within the scope of the inventive concept as expressed herein, commensurate with the above teachings, and/or the skill or knowledge in the art of filter preparation and, more particularly cigarette filter preparation.

The embodiments described hereinabove are further intended to explain the best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A method for forming a carbon article with template shaped channels, the method comprising:
   mixing a carbon precursor with a shaped fibrous template selected from the group consisting of trilobal shaped fibers, quadric-lobal shaped fibers, V-shaped fibers, stylized I-shaped fibers, nested stylized I-shaped fibers and C-shaped fibers;
   forming the mixture into a pre-determined shape;
   curing the mixture to form a carbon precursor composite with the predetermined shape;
   carbonizing the carbon precursor composite; and
   decomposing the fibrous template to yield a carbon article with template shaped channels,
   and wherein forming the mixture into a pre-determined shape comprises pulling the mixture through a mold and trimming or cutting the mold into a discrete shape,
   the mold comprising a material selected from a group consisting of: paper, metal, plastic and glass, and
   wherein the mold is removed subsequent to the curing step and prior to the carbonizing step.

2. The method according to claim 1, wherein the fibrous template comprises polypropylene.

3. The method according to claim 1, wherein the mold is a tube.

4. The method according to claim 1, wherein carbonizing is performed in an inert media under vacuum, or a combination thereof.

5. The method according to claim 1, wherein the carbonizing step and decomposing step occur simultaneously.

6. The method according to claim 1, wherein the shaped carbon article is a monolithic tube.

7. The method according to claim 1, wherein the carbonizing step is conducted at a temperature in the range of approximately 600° C. to approximately 950° C.

8. The method according to claim 7, wherein the carbon precursor is a phenolic resin.

9. The method according to claim 7, further comprising activating the carbon precursor.

* * * * *

UNITED STATES PATENT AND TRADEMARK OFFICE
CERTIFICATE OF CORRECTION

PATENT NO. : 7,767,134 B2 Page 1 of 1
APPLICATION NO. : 11/170272
DATED : August 3, 2010
INVENTOR(S) : Lixin L. Xue et al.

It is certified that error appears in the above-identified patent and that said Letters Patent is hereby corrected as shown below:

On the front page of the patent should read:

In the right column, (74) Attorney, Agent, or Firm – Connolly Bove Lodge & ~~Hut~~ Hutz LLP Signed and Sealed this Fifth Day of October, 2010

David J. Kappos
*Director of the United States Patent and Trademark Office*